United States Patent Office 3,194,766
Patented July 13, 1965

3,194,766
DIELECTRIC COMPOSITION
Jean Coquillion, Saint-Didier-au-Mont-d'Or, France, assignor to Progil, Paris, France, a corporation of France
No Drawing. Filed Oct. 5, 1962, Ser. No. 228,733
Claims priority, application France, Oct. 4, 1961,
874,949
5 Claims. (Cl. 252—66)

This invention relates to a new improved dielectric, more especially a liquid comprising one or more polychlorodiphenyls.

The manufacture of chlorinated diphenyls and the use thereof in electrical equipment has been known for many years.

The diphenyl is generally chlorinated in the presence of a substitution catalyst, for example iron or antimony, until the desired chlorine content is obtained, then the crude product is subjected to simple vacuum distillation in order to separate chlorination tars therefrom and thus to obtain a more or less viscous colorless liquid which has outstanding insulating properties after a treatment by absorption on an activated earth.

Generally, the products with 41%, 48% or 54% by weight of chlorine are successfully used for impregnating paper condensers. Their fairly high permittivity enables condensers to be obtained which have relatively small dimensions and which are of very high quality.

These conventional chlorinated diphenyls are complex mixtures. For example, the product with 41% of chlorine, which is known under the name of trichlorinated diphenyl because this total content corresponds to 3 chlorine atoms per molecule, in actual fact contains mainly dichlorodiphenyls, trichlorodiphenyls and tetrachlorodiphenyls in the form of a certain number of isomers.

The known mixtures have a fairly high permittivity which is however always lower than 6 at 25° C. at a frequency of 50 c./s. For example, as regards the chlorodiphenyls with 41% of chlorine, it is in the region of 5.9 at 26° C., whereas it approaches 5.6 at 25° C. for the chlorodiphenyls with 48% of chlorine and it is about 5.0 for the chlorodiphenyls with 54% of chlorine.

For certain applications and particularly for use in condensers, it would be desirable to have impregnants with a permittivity higher than that of the conventional chlorinated diphenyls, besides the advantageous physical and chemical properties of these known products.

This problem is solved by the present invention which now makes available for the electrotechnical art new liquids which have decided advantages in various applications over the known liquid dielectrics. More especially it makes possible the manufacture of papers impregnated with dielectric substance, in which the permittivity of the impregnant is very close to that of the paper itself at the normal operating temperatures of the condensers. As a consequence, the electrical stresses are uniformly distributed between the fibre and the impregnant and, on the other hand, the paper acquires a permittivity which is practically independent of its density. The same advantage of the dielecertic substances according to the invention is shown in applications to other electrical equipment comprising impregnated paper, more especially cables, transformers, etc.

The work which has resulted in the present invention has discovered the unexpected fact that in the mixtures of poly-chlorodiphenyls currently employed, there are dichlorinated compounds having a permittivity which is clearly much stronger than that of these mixtures themselves. It has thus been found to be possible, contrary to the prior art, to obtain dielectric liquids based on dichlorinated diphenyl which have a permittivity higher than that of similar known products.

The new dielectric substance according to the invention comprises 2,4'-dichlorodiphenyl, alone or admixed with other dielectric organic compounds, the mixture containing at least 20% by weight of 2,4'-dichlorodiphenyl and being free from non-chlorinated diphenyl and monochlorinated diphenyls, of which the boiling points under a pressure reduced to 10 mm. Hg are below 135° C.

The main product according to the invention is the dichlorodiphenyl boiling at 159° C./10 mm. Hg and melting at about 43.5° C. Solidified in the supercooled state at 25° C., it has a permittivity of 7.7 for 50 c./s., while this characteristic is only 5.9 under the same conditions for the usual chlorodiphenyls with approximately 41% of Cl, that is to say, of average composition corresponding substantially to $C_{12}H_7Cl_3$. At 100° C., the permittivity of the new product is 6.1 against 4.85 for the aforementioned known liquid.

In accordance with one important feature of the invention, the 2,4'-dichlorodiphenyl is used in the form of mixtures having a relatively large content of this compound and also containing other polychlorodiphenyls or possibly other compatible dielectric liquids. Thus a highly advantageous liquid according to the invention for example, comprises a fraction having a very high (about 95%) 2,4'-dichlorodiphenyl content, distilling at 157–161° C., under a pressure of 10 mm. Hg; the total content of chlorine in this fraction is 31.8% by weight. This liquid solidifies at about 32° C.; its permittivity at 25° C. in the supercooled state is 7.5; it is 6.0 at 100° C.

Liquids according to the invention can also be formed by less rich mixtures containing for example 20% to 95% by weight of the 2,4'-isomer; contents of 30% to 60% are frequently very suitable, depending on the proposed use and according to the nature of the liquid or liquids which accompany the 2,4'-isomer. For example, the mixture of polychlorodiphenyls with about 41% of Cl, distilling at 152° to 166° C./10 mm. Hg, comes within the scope of the invention.

The mixtures according to the invention do not contain products boiling below 135° C./10 mm. Hg, and preferably all their fractions distill above 145° C./10 mm. Hg or better still above 150° C.

In order to obtain dielectric substances according to the invention, it is possible to mix the 2,4'-dichlorodiphenyl, or a fraction having a high content of this isomer, with trichlorodiphenyls so that the mixture contains at least 20% by weight of the 2,4'-isomer; the nonchlorinated and monochlorinated diphenyls are absent from this mixture, but on the other hand various trichlorodiphenyls are found therein, and of these particularly the 3,4,4', 2,5,2', 2,3,2' and 2,6,2'-isomers in a considerable proportion; it is advantageous for these last four isomers to be present at a rate of approximately 5% to 20% by weight, and more particularly 8 to 15%. The compositions contain appreciable amounts of 3,4,4'- and 2,6,2'-trichlorodiphenyls.

On the other hand, the 2,4'-dichlorodiphenyl, or a fraction having a high content of this compound, can with advantage be mixed with tetrachlorodiphenyls in order to form very useful dielectric compositions.

Preferably, the mixtures according to the invention intended for impregnation of paper have permittivities between 6 and 7 at 25° C.

The 2,4'-dichlorodiphenyl or fractions containing the same with a very high content can be used as such for impregnating paper condensers, but on account of the relatively high crystallisation points of these products and despite their great tendency to supercooling, it is possible that the liquid might set in the condenser at ambient temperature with an appreciable loss of permittivity. On the other hand, experience shows that if it is desirable to obtain impregnants with a permittivity higher than 6, the excessive increase in the permittivity of the impregnant liquid can present certain technical difficulties. Actually, ionising power of the insulating liquids with respect to dissolved impurities which can be decomposed by electrolysis is increased very rapidly as the permittivity of these liquids rises. However, taking into account that the chlorinated diphenyls are good solvents, it is difficult to avoid, during the use thereof, a small amount of contamination by the equipment and the materials with which they are used. This contamination can impart dielectric losses to the liquid, which are stronger as the permittivity is higher. It is thus all the more difficult to obtain and conserve small losses with these dielectric liquids when the permittivity thereof is higher. When the losses of the liquid impregnant are very great, the dielectric losses of the condensers which are impregnated therewith are higher than normal, especially under heat, and the condenser may be in danger of thermal instability during the use thereof.

In order to obviate these possible disadvantages, by ensuring that the liquid has a fairly low freezing point and by limiting its permittivity to adequate values, it is advantageous that the fraction with a high 2,4'-dichlorodiphenyl content should have added thereto other conventional polychlorinated diphenyls or certain distillation fractions of these conventional polychlorinated diphenyls, or even chlorinated derivatives other than those of diphenyl.

When it is a question of impregnating paper for condensers, it is advantageous to make the majority of these mixtures in equal parts, but it is to be fully understood that different proportions come within the scope of the invention.

For example, by mixing the said fraction 157–161° C./10 mm. in approximately equal parts with a conventional trichlorodiphenyl, a product is obtained which has a low freezing point in the region of −28° C., accompanied by a permittivity of 6.70 at 25° C. and a chlorine content of 36.5%.

It is also possible for the product with a high content of 2,4'-isomer to be mixed with a conventional tetrachlorodiphenyl in almost equal parts so as to obtain physical characteristics such as freezing point, viscosity, vapor tension, etc., which are very close to those of the conventional trichlorodiphenyls, but having a permittivity in the region of 6.55 at 25° C.

The dielectric liquid according to the invention may also comprise one or more selected tetrachlorodiphenyls with a permittivity higher than 5.6. It is known that this characteristic is of the order of 5.6 at 25° for the known mixtures of tetrachlorodiphenyls having a total content of about 48% of Cl. According to the invention, there are chosen from these latter those of which the permittivity is higher than that of the mixtures normally used.

Thus, for example, a dielectric composition according to the invention comprises tetrachlorodiphenyls boiling between 177° and 186° C. under a pressure of 5 mm. Hg; such a product thas a permittivity of 6.2 at 25° C.

Mixtures of tetrachlorodiphenyls, particularly those which distil from 173° to 187° C./5 mm., and which contain only part of the compounds present in the tetrachlorodiphenyls usually employed, are also useful as dielectric compositions according to the invention; they are particularly valuable as adjuvants for the products with a high 2,4'-dichlorodiphenyl hereinbefore described in an amount of 35% to 65% by weight, for example, but these proportions are not limiting.

In general terms, whatever the polychlorodiphenyls selected according to the invention and the liquids with which they are possibly mixed, the permittivity of the new dielectric composition obtained is always higher than that of a known liquid based on polychlorodiphenyls having substantially the same total chlorine content.

The new dielectric compositions according to the invention can be obtained by a process which is extremely interesting from an industrial point of view and which forms part of the present invention. This process consists in first of all carrying out the direct chlorination of the diphenyl, in a manner known per se, to a total chlorine content of for example 30 to 54% and, after neutralization, in fractionating the mixture which is obtained in order to extract therefrom the compounds with a permittivity higher than 5.9, or even to enrich a certain fraction with these compounds.

The fractionation can be achieved by any known physical method, such as absorption, freezing, diffusion, etc. Good industrial results have been obtained under suitable economic conditions by fractional distillation in vacuo.

In order to ensure the separation of the distillate fractions of desired permittivity, independently of possible fluctuations in the residual pressure in the distillation apparatus, one process according to the invention includes the continuous control of the permittivity of the distillate. In accordance with this process, the distilled fractions of which the permittivity is between the previously fixed limits are collected separately.

The products according to the invention are particularly suitable for heat transfer purposes, and can for this reason be applied not only to electrical apparatus, but to all other machines and apparatus benefiting from the thermal and chemical stability of these products from the point of view of heat transfer.

In order to illustrate the invention, several examples are given below, it being understood that these examples do not have any limiting character.

Example 1

Diphenyl was chlorinated in the presence of ferric chloride to a chlorine content of 32% in accordance with the well known process.

The chlorination product was a liquid with a deep chestnut color which permitted the deposition at ambient temperature of crystals of a sparingly soluble dichlorodiphenyl isomer, namely the 4.4'-dichlorodiphenyl.

After separating the crystals by filtration and neutralising with an alkali and drying, a liquid was obtained which had a density of 1.293 at 22° C. 1250 ml. of this liquid were subjected to distillation under a reduced pressure of 10 mm. Hg in an apparatus equipped with a column having an efficiency of about 40 theoretical plates.

After the passage of a head fraction containing monochlorinated diphenyls, then a stage at 151° C. corresponding to the dichlorinated 2,2'-isomer, reserved for another use, 250 ml. of distillate were collected. At this instant the receiver was changed and 175 ml. of an intermediate fraction were collected which passed over between 151 and 157° C./10 mm. Hg. This intermediate fraction, containing a fairly large proportion of the desired isomer, was stored so as to be added to a following distillation. There were then collected 350 ml. of an interesting fraction distilling over between 157° and 161° C. with a stage at 159° C. the vacuum always being 10 mm. Hg. This fraction eventually crystallised and melted entirely at 32° C. It contained 95% of 2,4'-dichlorodiphenyl isomer.

Its permittivity was 7.50 at 23° C., while the previously heated product was in the state of liquid in superfusion. At 100° C., the permittivity was 6.0.

The distillation was then continued to a temperature of 173° C.; the new fraction of 100 ml. with a high 2,4'-isomer content, was placed on one side to be added to the following distillation.

The distillation was then stopped.

Example 2

The diphenyl was chlorinated in a manner analogous to that indicated in the previous example, but increasing the chlorine content up to 48% to correspond to the chlorine content of the tetrachlorodiphenyls.

The viscous liquid, obtained after neutralisation with an alkali, was subjected to distillation in a vacuum distillation apparatus equipped with a column having an efficiency of about 40 theoretical plates. The liquid to be distilled occupied a volume of 1500 ml. and had a density of 1.450 at 25° C.

The distillation was carried out under reduced pressure at 5 mm. Hg.

The permittivity of the distillate was continuously controlled and served as a criterion of the cut of the interesting fraction. During the distillation of the first 600 ml., there occurred a drop in the permittivity of the distillate from 5.5 (always determined at 25° C. for 50 c./s.) to below 5, followed by a rise to 5.6. At this moment, the thermometer at the top of the column indicated 173° C. and collection was started of the interesting fraction which distilled, while the permittivity rose to just above 6 and then dropped again to 5.6. When this latter limit had been reached, the temperature at the top of the column was 187° C.; the distillation was then stopped. The 400 ml. of the fraction at 173°–187°/5 mm. Hg, titrating 48.6% of Cl, which were thus collected showed a permittivity of 5.9 at 25° C. as compared with 5.6 for the initial mixture of treated tetrachlorodiphenyls.

Example 3

In an operation identical with that of Example 2, the distillate fraction which distilled between 177° and 186° C./5 mm. Hg was separated. The 220 ml. of product thus obtained had a permittivity of 6.21 at 25° C.

Example 4

There were used equal parts, on the one hand of the fraction at 157°–161° C./10 mm. Hg, with a high content of 2,4'-dichlorinated isomer according to Example 1, and on the other hand of the large fraction at 173°–187° C./5 mm. Hg of tetrachlorodiphenyl according to Example 2. These two fractions were mixed and then the mixture was purified by treatment on activated earth by a well known process. The following characteristics were found in respect of this mixture:

Chlorine content, percent _____ 40.2
Density:
    At 25° C _____ 1.359
    At 100° C _____ 1.292
Viscosity in cinematic units, centistokes:
    At 25° C _____ 31.0
    At 40° C _____ 13.2
    At 60° C _____ 5.72
    At 80° C _____ 3.20
    At 100° C _____ 2.17
Refractive index, at 25° C _____ 1.6232
Permittivity for 50 c./s.:
    At 25° C _____ 6.79
    At 40° C _____ 6.47
    At 60° C _____ 6.10
    At 80° C _____ 5.77
    At 100° C _____ 5.50
Dielectric losses at 50 c./s., at 100° C _____ 0.023
Freezing point, ° C _____ −24

Example 5

A group of wound condensers with 3 layers of paper with a density of 0.9 was impregnated under vacuum, using the normal procedure, with the mixture according to Example 4, while identical coils were impregnated with the conventional trichlorodiphenyls. The two groups of coils showed practically identical dielectric loss curves at a frequency of 50 c./s. On the other hand, the group of condensers impregnated with the mixture according to the invention had a capacity on average higher by 7.5% than the average capacity of the other group. Subjected to cooling, the condensers impregnated with the mixture according to the invention showed a loss in capacity from −34° C., while those of the other group started to lose the capacity from −30° C.

Example 6

Diphenyl was chlorinated in the presence of ferric chloride to the chlorine content of 32% in a manner analogous to that of Example 1. The crude product, neutralized and separated from the 4,4'-dichloro crystals, was subjected to distillation, and a fraction enriched with 2,4'-dichlorodiphenyl containing 75% by weight of this isomer was recovered between 154° and 164° C. under a vacuum of 10 mm. Hg. This fraction had a permittivity of 7.00 at 25° C. and a point at which crystallisation started at 26° C.

Example 7

4 parts of the fraction distilling at 155°–165°/10 mm. Hg. and with a high content of 2,4'-dichlorodiphenyl, i.e. similar to that of Example 6, were mixed with 4 parts of conventional trichlorodiphenyls and 2 parts of conventional tetrachlorodiphenyls. The mixture thus obtained had the following characteristics:

Chlorine content, percent _____ 40.0
Density:
    At 25° C. _____ 1.348
    At 100° C. _____ 1.284
Freezing point, ° C. _____ −24
Permittivity:
    At 25° C. _____ 6.30
    At 40° C. _____ 6.03
    At 60° C. _____ 5.72
    At 80° C. _____ 5.43
    At 100° C. _____ 5.17
Cinematic viscosity, centistokes:
    At 25° C. _____ 27
    At 40° C. _____ 11.5
    At 60° C. _____ 5.2
    At 80° C. _____ 3.2
    At 100° C. _____ 2.07
Dielectric losses after purification treatment by absorption, 50 c./s.: tg δ=0.020 for 100° C.

Example 8

A group of condensers wound with three layers of paper with a density of 0.9 was impregnated under vacuum, by the usual procedure, with the mixture according to Example 7, while identical coils were impregnated with conventional trichlorodiphenyls. The two groups of coils showed practically identical dielectric loss curves at the frequency of 50 c./s. On the other hand, the group of condensers impregnated with the mixture according to the invention had an average capacity higher by 5% than the average capacity of the other group, and this capacity only fell on cooling to below −36° C., while the condensers impregnated with trichlorodiphenyls started to lose their capacity at −30° C.

Example 9

4 parts of the fraction at 157°–161° C./10 mm., with a very high 2,4'-dichlorodiphenyl content, according to Example 1, were mixed with 4 parts of conventional trichlorodiphenyls and 2 parts of conventional tetrachlorodiphenyls. This mixture had physical characteristics quite similar to those of the mixture referred to in Example 7, except as regards the permittivity, which was stronger, and reached the value of 6.5 at 25° C.

Example 10

1 part of the fraction at 157°–161° C./10 mm., according to Example 1 with a very high 2,4'-dichlorodiphenyl content, was mixed with 3 parts of conventional trichlorodiphenyls. A liquid was obtained which had a permittivity of 6.30 at 25° C. Paper coils impregnated with this liquid had characteristics quite similar to those of the condensers referred to in Example 8 with nevertheless a fall in permittivity on cooling, which only occurred in the region of −40° C.

I claim:
1. A dielectric composition constituted of polychlorodiphenyls having in their molecules 2 to 4 chlorine atoms, characterized in that it contains, by weight, at least 20% of 2,4'-dichlorodiphenyl and 40% to 70% of polychlorodiphenyls having in their molecules 3 to 4 chlorine atoms.

2. A dielectric composition constituted of polychlorodiphenyls having in their molecules 2 to 4 chlorine atoms, characterized in that it is composed, by weight, of 30% to 60% of 2,4'-dichlorodiphenyl and 70% to 40% of polychlorodiphenyls having in their molecules 3 to 4 chlorine atoms.

3. A dielectric composition constituted of polychlorodiphenyls having in their molecules 2 to 4 chlorine atoms, characterized in that it is composed, by weight, of 30% to 60% of 2,4'-dichlorodiphenyl and 70% to 40% of polychlorodiphenyls having in their molecules 3 to 4 chlorine atoms, while 5% to 20% of the weight of the total composition is constituted by trichlorodiphenyl isomers 3,4,4', 2,5,2', and 2,6,2'.

4. A dielectric composition constituted of polychlorodiphenyls, characterized in that it is composed, by weight, of 30% to 60% of polychlorodiphenyls which distill between 155° and 165° C. at 10 mm. of mercury, and of 70% to 40% of polychlorodiphenyls which distill between 173° and 187° C. at 5 mm. of mercury.

5. A dielectric composition constituted of polychlorodiphenyls, characterized in that it is composed, by weight, of 30% to 60% of polychlorodiphenyls which distill between 157° and 161° C. at 10 mm. of mercury, and of 70% to 40% of polychlorodiphenyls which distill between 173° and 187° C. at 5 mm. of mercury.

References Cited by the Examiner

UNITED STATES PATENTS

| | | | |
|---|---|---|---|
| 2,617,770 | 11/52 | Hardy et. al. | 252—66 XR |
| 2,977,516 | 3/61 | Weingarten | 252—66 XR |
| 3,038,107 | 6/62 | Weingarten | 252—66 XR |
| 3,068,297 | 12/62 | Weingarten | 252—66 XR |

JULIUS GREENWALD, *Primary Examiner.*